United States Patent [19]

Herres

[11] Patent Number: 5,113,303

[45] Date of Patent: May 12, 1992

[54] GROUNDING DETECTION CIRCUIT

[75] Inventor: Donald C. Herres, Fayetteville, N.Y.

[73] Assignee: Cooper Industries, Inc., Houston, Tex.

[21] Appl. No.: 501,033

[22] Filed: Mar. 29, 1990

[51] Int. Cl.$^5$ .............................................. H02H 3/16
[52] U.S. Cl. ...................................... 361/45; 361/215; 340/649
[58] Field of Search ............... 340/649, 650, 652; 361/49, 45, 215; 324/96, 509, 510

[56] References Cited

U.S. PATENT DOCUMENTS

| | | | |
|---|---|---|---|
| 3,290,668 | 8/1963 | Perretta | 340/649 |
| 3,343,154 | 12/1964 | Seesselberg | 340/255 |
| 4,419,589 | 12/1983 | Ross | 361/191 |
| 4,691,263 | 9/1987 | Kenny | 361/58 |

Primary Examiner—Steven L. Stephan
Assistant Examiner—Adolf Berhane
Attorney, Agent, or Firm—Michael F. Heim

[57] ABSTRACT

An improved grounding detection circuit includes an intrinsically safe circuit connected to a grounding clip for grounding vehicles and container durng the transfer and storage of combustible materials. The intrinsically safe circuit includes grounding loop for verifying that the grounding clip and the intrinsically safe circuit are grounded. The intrinsically safe circuit transmits a signal to an optoisolator when the container is grounded, and the optoisolator, in turn, transmits an energization signal to relay circuitry, to energize a relay coil. A capacitor in series with a resistor are connected across the relay coil to minimize the inductive effect of the relay coil on the optoisolator.

14 Claims, 2 Drawing Sheets

GROUNDING DETECTION CIRCUIT

BACKGROUND OF THE INVENTION

This invention relates generally to grounding and indicating devices. More particularly, the invention relates to an intrinsically safe indicator and grounding device for use with tank vehicles, drums or other portable containers during the transfer and storage of combustible materials.

The transfer and storage of combustible materials requires careful handling to minimize the possibility of explosions. A static discharge from the vehicle or container could trigger such an explosion, causing severe damage. The possibility of a static build-up increases whenever the combustible material is placed in or removed from a container. Circulation of the combustible material causes a potentially dangerous static charge build-up.

Thus, it has become customary to ground containers when combustible material is being transferred, and to provide an indication to an operator that he or she has properly grounded the container. Some representative examples of such a grounding and indicating device may be found in U.S. Pat. Nos. 3,290,668, 3,343,154, 3,996,496, 4,225,899 and 4,642,554. The device shown in U.S. Pat. No. 3,290,668, issued to Perretta, and assigned to the assignee of the present invention, has been the industry standard for over twenty years.

U.S. Pat. No. 3,290,668, the teaching of which is incorporated by reference herein, discloses a grounding clip for attaching to the container to insure that the container is grounded. When the grounding clip connects to a container, it closes the associated circuit, causing a miniature lamp to ignite. Ignition of the lamp triggers a photo-conductive cell, which, in turn, energizes a sensitive relay that is normally-open. The sensitive relay closes, thereby energizing a load relay and causing it to switch. When energized, the load relay connects a green lamp to the power supply and disconnects a red lamp from the power supply. A valve is connected in parallel across the green lamp, which is energized together with the green lamp. Once energized, the valve permits the combustible material to be pumped through a pump interlock.

One of the key requirements of the grounding circuit in U.S. Pat. No. 3,290,668 is that the portion of the circuit connected to the grounding clip must be operated at a relatively low voltage, so that even if there is a failure in this portion of the circuit, the discharge from such a failure will be so small that the combustible material will not be ignited or affected in any way. As a result, the circuit elements must be capable of low power operation. This places certain limitations on the circuit elements that can be used.

Yet another requirement is that any circuit failure should be such that it prevents the pumping of combustible material until the failure has been repaired. The grounding device, therefore, preferably should leave the red lamp on when it fails. If the device fails and leaves on the green lamp, a dangerous situation arises.

Still another problem with the prior art grounding devices is the requirement of a photo-conductive cell to isolate the intrinsically safe circuit from the rest of the circuitry. These cells are extremely susceptible to ambient light, and thus they must be carefully shielded to prevent erroneous triggering. Those skilled in the art have realized that it would be advantageous to use a solid state optoisolator or optoelectronic coupler, which are basically immune from the effects of ambient light, in place of the lamp and photocell. The problem, however, is that such an optoisolator cannot be used with a relay, because a relay constitutes an inductive load, which causes a phase shift, with the voltage leading the current by 90°. This causes a major problem because, as the current through the output of the optoisolator goes to zero, the voltage across the relay, and thus across the output of the optoisolator, is at a maximum. This results in a voltage spike across the output terminals of the optoisolator, which will cause the optoisolator to fail prematurely, usually within three or four applications.

To date, no one skilled in the art has been able to develop a grounding device that uses an optoisolator that works effectively with a relay, without burning out in an unreasonably short time period. Some designers have attempted to utilize triacs in the circuit as a substitute for relays. The problem with using triacs is that triacs tend to fail by shorting out, as compared to a relay, which normally fails in an open state. A shorted-out triac can cause the green lamp to remain lit even when the container is not grounded.

Another problem with prior art grounding devices is that these devices are designed on the assumption that the intrinsically safe circuit is, in fact, grounded. If the intrinsically safe circuit is not grounded, then the clip will not ground the container. Such a situation can occur, for example, when an operator or field installer fails to properly connect the grounding device to ground.

These and other problems with the prior art grounding and indicating devices have necessitated the development of the present invention.

SUMMARY OF THE INVENTION

Accordingly, there is provided herein an intrinsically safe circuit connected to a grounding clip for grounding a container, which stores a combustible material. The intrinsically safe circuit includes an optoisolator which turns on when the grounding clip connects to a container. The optoisolator links the intrinsically safe portion of the circuit to external switches and relays. A relay connects to the output of the optoisolator and is energized when the optoisolator is on. Energization of the relay causes a green lamp to be connected to a power supply, while a red lamp is disconnected. A series connected capacitor and resistor are connected in parallel across the relay to maintain the phase of the voltage and current across the output terminals of the optoisolator, despite the presence of the inductive load represented by the relays.

A step-down transformer provides energy to the intrinsically safe portion of the grounding circuit. A rectifier converts the secondary voltage to a dc voltage, which powers the optoisolator. The primary side of the transformer connects to the relays and lamps to provide power to these elements.

The intrinsically safe circuit also includes an additional ground loop to provide extra assurance that the intrinsically safe circuit and the container are grounded.

These and various other characteristics and advantages of the present invention will become readily apparent to those skilled in the art upon reading the following detailed description and claims and by referring to the accompanying drawings.

DESCRIPTION OF THE DRAWINGS

In the detailed description of the invention, reference will now be made to the accompanying drawings, wherein:

FIG. lA is a schematic diagram of a grounding detection circuit constructed in accordance with the preferred embodiments;

FIG. lB is a schematic diagram of the load relay contacts associated with the load relay found in FIG. 1.

DETAILED DESCRIPTION OF THE PREFERRED EMBODIMENT

Figure 1A:
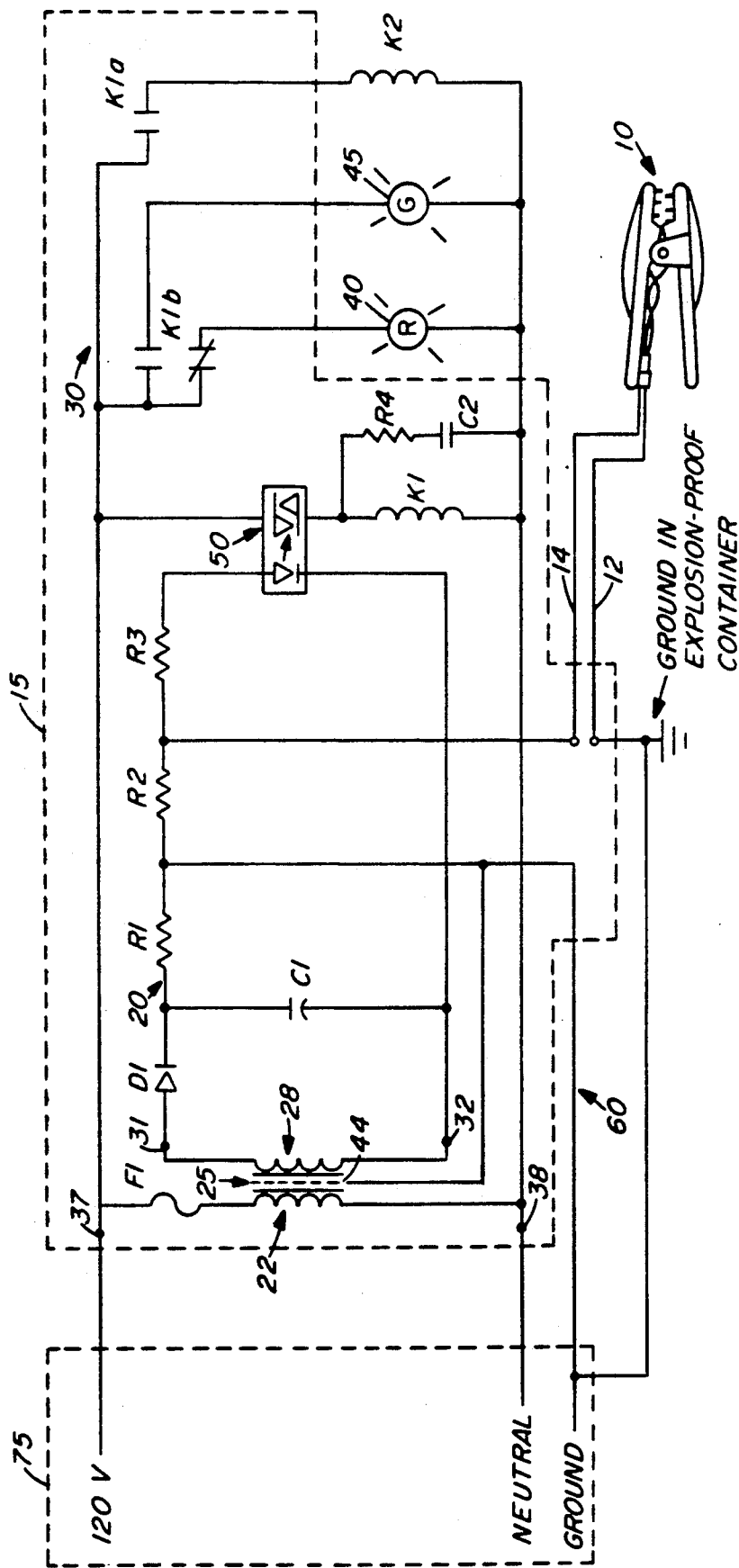

Referring to FIG. 1A, a grounding detection circuit constructed in accordance with the principles of the present invention comprises an intrinsically safe circuit 20 connected to a grounding clip 10, a step-down transformer 25 providing power to the intrinsically safe circuit 20, and a relay and indicating circuit 30. A majority of the intrinsically safe circuit 20 and the relay and switching circuiting 30 preferably are mounted by conventional techniques on a circuit board 15. As is well-known in the art, the circuit board 15 is mounted in an explosion proof housing (not shown).

Typically, the combustible material will be dispensed by a pump at a particular location. A control panel 75, including a power supply and ground, normally is located on-site with the pump. The power supply preferably provides 120 volts ac; however, one skilled in the art can make the necessary modification to the present invention for power supplies of other voltage levels without departing from the principles herein.

The step-down transformer 25, in accordance with conventional techniques, includes a primary, high voltage side 22, and a secondary, low voltage side 28. In the preferred embodiment, the transformer 25 also includes a grounded core 44. The primary side 22 of the step-down transformer 25 includes a first terminal 37 and a second terminal 38, which connect electrically to the 120 volt power supply. A fuse F1 preferably connects between the hot side of the power supply and the transformer 25. The secondary side 28 of transformer 25 includes a first terminal 31 and a second terminal 32 which connects to the intrinsically safe circuit 20.

Referring still to FIG. 1A, the intrinsically safe circuit 20 preferably connects to the secondary side 28 of the step-down transformer 25 and includes a diode D1, a capacitor C1, resistors R1, R2, R3, and the input of an optoisolator 50. The anode of diode D1 connects to the first terminal 31 of transformer 25 and capacitor C1 connects between the cathode of diode D1 and the second terminal 32 of the secondary 28 of transformer 25.

Resistor R1 connects at a first terminal to the cathode of diode D1, and at a second terminal that connects both to resistor R2 and to ground. Resistor R2, in turn, connects both to the grounding clip 10 through lead 14, and to resistor R3. Resistor R3 connects to the input of the optoisolator 50, which also connects to the second terminal 32 of the secondary 28 of transformer 25.

Lead 14, connected at one end to resistors R2 and R3, electrically connects at its other end to the grounding clip 10. Grounding clip 10 also connects to lead 12, which connects to ground in the explosion proof housing. Both the ground from the housing and resistor R2 connect to the ground on the control panel 75, thereby providing a ground loop 60.

Referring still to FIG. 1A, the relay and indicating circuit 30 connects to the primary of transformer 25 and preferably includes the output of optoisolator 50, relays K1 and K2, lamps 40, 45, resistor R4 and capacitor C2.

The first output terminal of optoisolator 50 connects to the first terminal 37 of transformer 25. The second output terminal of optoisolator 50 connects to relay coil K1 and to resistor R4. Resistor R4 connects in series to capacitor C2, which like relay coil K1, connects to the second terminal 38 on the primary side 22 of the transformer 25.

Figure 1B:
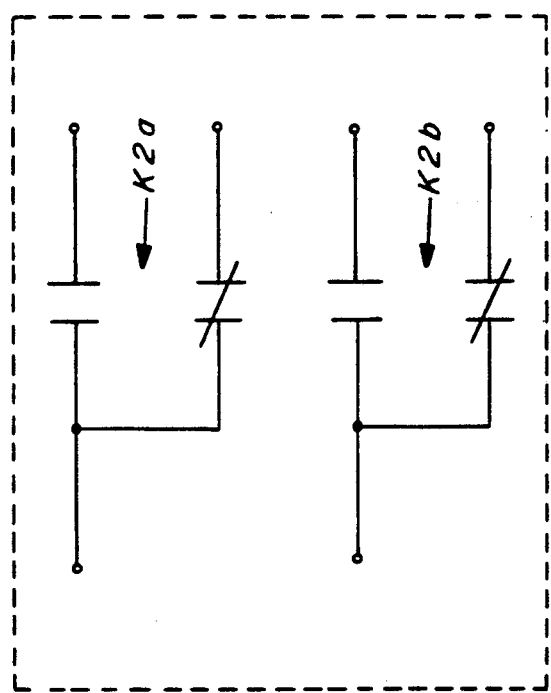

Relay K1 operates two sets of contacts K1a and K1b. Contacts K1a electrically connect to the first terminal 37 of the primary of transformer 27. The first set of contacts K1a include a normally open contact connected to green lamp 45, and a normally closed contact connected to red lamp 40. The second set of contacts K1b comprises a normally open contact connected to relay coil K2. The green lamp 45, red lamp 40 and relay coil K2 all connect to the second terminal 38 of transformer 25. Relay K2 also operates two sets of contacts K2a and K2b, as shown in FIG. 1B, which preferably are connected to the control panel 75 to regulate the flow of combustible material through a pump interlock, according to conventional techniques which are well known in the industry.

Lamps 40, 45 and relay K2 preferably are maintained inside of the explosion proof housing.

In the preferred embodiment the following electrical components are suitable for use in the grounding detection circuit of the present invention:

| | | |
|---|---|---|
| Transformer | 25 | Crouse-Hinds Std. Pt. No. 20H73-001 |
| Fuse | F1 | ¼ Amp Bussman Microtron or Little fuse #251 |
| Diode | D1 | IN 4001, IN 4002, IN 4003, or IN 4004 |
| Capacitor | C1 | 33 microfarad, 35V, Sprouge 513D336MD35A44, aluminum electrolyte |
| Resistor | R1 | 220 ohm, ¼ Watt, metal or metal film |
| Resistor | R2 | 470K ohm, ¼ Watt, metal or metal film |
| Resistor | R3 | 220 ohm, ¼ Watt, metal or metal film |
| Optoisolator | 50 | Phillips ECG3048 or General Electric GE3011 |
| Capacitor | C2 | .22 microfarad, 250 volts, metallized film, Westlake series 160 |
| Resistor | R4 | 560 ohm, ¼ watt, metal or metal film |
| Relay | K1 | P&B K10P11A55120 or Magnecroft W78ARPCX-5P |
| Relay | K2 | P&B PRD11AG0120 |
| Red lamp | 40 | EGP011-J1 |
| Green lamp | 45 | EGP011-J3 |

While the above components have been used in the preferred embodiment, one skilled in the art will realize that many other components may be used without departing from the spirit of the invention.

Referring again to FIG. 1, the operation of the grounding detection circuit will be discussed.

The external control panel 75 provides 120 volts ac to the primary 22 of the transformer 25. The transformer 25 steps down the voltage, which is rectified by diode D1 and capacitor C1 to provide a 15 volt dc signal. Resistors R1 and R3, which alternatively could comprise a single resistor, limit the power on the discharge path of capacitor C1.

Resistor R2 is selected to be very large to tie the circuit together. Alternatively, R2 may be left out of the circuit. When the grounding clip 10 clamps onto a vehicle or container, the vehicle or container becomes grounded because lead 12 is connected to ground.

The voltage across capacitor C1, as resistor R2 shorts out, is sufficient to energize the optoisolator 50, causing it to conduct. Before the optoisolator begins to conduct, the normally closed contact K1 connects red lamp 40 to the primary of transformer 25, and thus, to the 120 V ac power supply.

When the optoisolator 50 conducts, an output signal is transmitted at the output of the optoisolator. This output signal energizes relay coil K1, to close the normally open contact, turning on green lamp 45 and energizing relay coil K2, and opening the normally closed contact to turn off red lamp 40.

By choosing a proper value for capacitor C2, the phase shift which would otherwise occur due to the inductance of relay coil K1 can be minimized or eliminated, to thereby present what appears to be a resistive load to the optoisolator 50. This means that when the optoisolator turns off, the relay coil K1 has a voltage of approximately zero.

One problem, however, still remains. If the optoisolator is turned on when the voltage across the optoisolator is at a maximum, the optoisolator will try to immediately charge the capacitor C2, causing the optoisolator to fail. To eliminate this possibility, resistor R4 is provided to limit the current to capacitor C2. Resistor R4 thus eliminates the possibility of a rapid current spike at the optoisolator 50.

The use of relay K1 is particularly desirable for use in the grounding detection circuit not only because of its operation, but also because of the way it fails. While it is impossible to predict exactly how any device will fail, it is known that a normally open relay usually will fail in an open condition. This is advantageous because it means that, in most instances, the green lamp will not be turned on if a failure occurs.

While a preferred embodiment of the invention has been shown and described, modifications can be made by one skilled in the art without departing in substance from the spirit of the invention.

What is claimed is:

1. A grounding detection circuit for grounding containers, comprising:
    a control panel including means for supplying a-c power at a first voltage level and at a second voltage level;
    indicating circuit means connected to said power supplying means and receiving power at said first voltage level;
    grounding circuit means connected to said power supplying means and receiving power at said second voltage level;
    a grounding clip, electrically connected to said grounding circuit means, for clamping to the containers;
    an optoisolator connected to said grounding circuit means and to said indicating circuit means, for receiving a signal from said grounding circuit means that the container is grounded, and for transmitting an output signal to said indicating circuit means;
    wherein said indicating circuit means includes a relay coil, which is energized by the output signal transmitted from the optoisolator to provide an indication that the container is grounded and a series RC circuit connected in parallel across said relay coil to eliminate the inductive effect of said relay coil on said optoisolator.

2. A detection circuit as in claim 1, wherein said relay coil is associated with contacts connected to a lamp means.

3. A detection circuit as in claim 2, wherein said lamp means includes a red lamp and a green lamp, and said red lamp electrically connects to a normally closed contact associated with said relay coil, and said green lamp electrically connects to a normally open contact associated with said relay coil.

4. A detection circuit as in claim 3, wherein said relay coil is associated with a second normally open contact which is electrically connected to a load relay coil.

5. A detection circuit as in claim 4, wherein said load relay coil is associated with contacts connected to a control panel that control a pump interlock.

6. A detection circuit as in claim 1, wherein said grounding clip is electrically connected to ground and said grounding circuit means is also independently connected to ground.

7. A detection circuit as in claim 6, wherein said grounding circuit means includes a dc rectifier connected to said power supplying means.

8. A detection circuit as in claim 6, wherein said grounding circuit means includes a resistor connected at a first terminal to ground and at a second terminal to said grounding clip.

9. A detection circuit as in claim 1, wherein said power supplying means comprises a step-down transformer with a grounding core.

10. A grounding detection circuit, comprising:
    A step-down transformer with a primary side and a secondary side;
    an intrinsically safe circuit connected to the secondary side of said transformer;
    a grounding clip connected to said intrinsically safe circuit;
    a relay and indicating circuit connected to the primary side of said transformer;
    an optoisolator connected to said intrinsically safe circuit and to said relay and indicating circuit;
    wherein said relay and indicating circuit includes a relay coil for receiving an energization signal from said optoisolator, and a capacitor, connected across said relay coil for minimizing the inductive load represented by said relay coil.

11. A grounding detection circuit as in claim 10, wherein the voltage level on the primary side of said transformer is 120 volts a-c.

12. A grounding detection circuit, comprising:
    a control panel providing a-c power with a positive terminal and a ground terminal;
    a step-down transformer with a primary side and a secondary side connected on the primary side to said control panel;
    a relay and indicating circuit also connected to the primary side of said transformer;
    an intrinsically safe circuit connected to the secondary side of said transformer;
    a grounding clip connected between said intrinsically safe circuit and ground;
    wherein said intrinsically safe circuit includes a resistor connected at a first terminal to said grounding clip and at a second terminal directly to the ground terminal of said control panel.

13. A grounding detection circuit as in claim 12, further comprising:

an optoisolator for receiving grounding signals from said intrinsically safe circuit and for transmitting energization signals to said relay and indicating circuit.

14. A detection circuit as in claim 1, wherein said grounding circuit means connected to a ground terminal for said control panel.

* * * * *